(12) United States Patent
Smaidris et al.

(10) Patent No.: US 8,228,190 B2
(45) Date of Patent: Jul. 24, 2012

(54) VALVE MALFUNCTIONING DETECTION SYSTEM FOR A VACUUM SEWER AN ASSOCIATED METHODS

(75) Inventors: Thomas F. Smaidris, Melbourne, FL (US); R. Brent Saunders, Indian Harbour Beach, FL (US); Edward C. Gerhardt, Malabar, FL (US)

(73) Assignee: Data Flow Systems, Inc., Melbourne, FL (US)

( * ) Notice: Subject to any disclaimer, the term of this patent is extended or adjusted under 35 U.S.C. 154(b) by 0 days.

(21) Appl. No.: 12/813,223

(22) Filed: Jun. 10, 2010

(65) Prior Publication Data

US 2011/0205055 A1 Aug. 25, 2011

Related U.S. Application Data

(60) Provisional application No. 61/307,651, filed on Feb. 24, 2010.

(51) Int. Cl.
*G08B 1/08* (2006.01)
(52) U.S. Cl. ............. 340/539.17; 340/612; 340/539.1; 340/539.11; 340/506; 340/3.1
(58) Field of Classification Search ............ 340/612, 340/539.1, 539.11, 506, 3.1
See application file for complete search history.

(56) References Cited

U.S. PATENT DOCUMENTS

| | | | |
|---|---|---|---|
| 4,034,421 A | 7/1977 | Pihl et al. | |
| 5,588,458 A | 12/1996 | Ushitora et al. | |
| 5,644,802 A | 7/1997 | Olin | |
| 6,474,357 B2 | 11/2002 | Naski | |
| 2008/0155064 A1* | 6/2008 | Kosuge et al. | 709/219 |
| 2009/0250125 A1* | 10/2009 | Howitt | 137/551 |
| 2011/0192465 A1* | 8/2011 | Collings, III | 137/1 |

OTHER PUBLICATIONS

Steve Gibbs, Vacuum'System Solves Site Restrictions; Publicworks, Oct. 2003. Hanley-Wood, LLC, USA.
Steve Gibbs, Storm Survivors—Vacuum Sewers Withstand Florida's Hurricane Barrage; CE News, Apr. 2005, vol. 17, No. 3, ZweigWhite, Fayetteville, Arkansas, USA.

* cited by examiner

*Primary Examiner* — Daryl Pope
(74) *Attorney, Agent, or Firm* — Mark R. Malek, Esq.; Zies Widerman & Malek

(57) ABSTRACT

A valve malfunctioning detection system for use in a vacuum sewer system including a vacuum pit in fluid communication with a vacuum station is provided. The vacuum pit includes a vacuum sewer valve that is moveable between an opened position and a closed position. The valve malfunctioning detection system may include a radio unit adapted to be carried by the vacuum pit, a gateway radio in communication with the radio unit, a hub radio in communication with the gateway radio to receive a signal transmitted by the gateway radio, and a server in communication with the hub radio. The signal transmitted by the radio unit may include an indication of a status of the vacuum sewer valve.

26 Claims, 6 Drawing Sheets

Estimated Battery Life
Key Largo Mesh Network Battery Life Estimator

Energy Consumption (Amp-Hrs per Month)
Network Processor Timer (N, mins)

| Mean Number of Daily Valve Openings | 5 | 10 | 15 | 20 | 30 | 60 |
|---|---|---|---|---|---|---|
| 10 | 3.0007957 | 1.5007957 | 1.0007957 | 0.7507957 | 0.5007957 | 0.2507957 |
| 15 | 3.0010873 | 1.5010873 | 1.0010873 | 0.7510873 | 0.5010873 | 0.2510873 |
| 20 | 3.0013790 | 1.5013790 | 1.0013790 | 0.7513790 | 0.5013790 | 0.2513790 |
| 30 | 3.0022540 | 1.5022540 | 1.0022540 | 0.7522540 | 0.5022540 | 0.2522540 |
| 40 | 3.0028373 | 1.5028373 | 1.0028373 | 0.7528373 | 0.5028373 | 0.2528373 |

| Net Process wake-up Rate (/day) | 288 | 144 | 96 | 72 | 48 | 24 |
| Battery Life (2xD, 15 Openings/day) | 8 | 17 | 25 | 34 | 51 | 103 Months |

Power Consumption (mA):
Transmit 25
Receive 25
Idle 0.0007
Processor (mA): 0.7

Batteries:
2xD size (1.2V ea)
13 A-Hr ea (Alkaline)
$0.95 ea

Processor Event:
No failure: 10 secs on
Failure: 10 secs on, 10 secs off
Failure Rate: 1/yr, battery replaced Network Processor Event:
TX Mode: 5 secs
RX Mode: 45 secs
Idle Mode: Nx60 secs

VALVE MALFUNCTIONING DETECTION SYSTEM FOR A VACUUM SEWER AN ASSOCIATED METHODS

RELATED APPLICATIONS

This application claims the benefit of U.S. Provisional Patent Application Ser. No. 61/307,651 titled VALVE MALFUNCTIONING DETECTION SYSTEM FOR A VACUUM SEWER AND ASSOCIATED METHODS filed on Feb. 24, 2010, the entire contents of which are incorporated herein by reference.

FIELD OF THE INVENTION

The present invention relates to field of vacuum sewer systems and, more specifically, to the field of detection of faulty valves in vacuum sewer systems and associated methods.

BACKGROUND OF THE INVENTION

Vacuum sewer systems are commonly used on large vessels, such as, for example, cruise ships. In recent times, vacuum sewer systems have been used for municipal sewer systems. As illustrated, for example, in U.S. Pat. No. 5,588,458 to Ushitora et al., a typical sewer system includes a vacuum pit, or a soiled water basin, that collects soiled water from a plurality of sources, e.g., in a residential setting, one soiled water basin may be used to accept soiled water from more than one house. Soiled water stored in the soiled water basin may be sucked through a suction pipe by opening a vacuum valve. The system may include a vacuum valve controller that closes the vacuum valve by detecting that the suction pipe has begun to suck air from a change of the pressure difference between two points in the suction pipe. These two points are illustrated as being different in height along the suction pipe from one another. Accordingly, the vacuum sewer system disclosed in the Ushitora et al. '548 patent is adapted to sense the level of soiled water in the soiled water basin using pressure differential to close a vacuum valve.

Another type of vacuum sewer system is disclosed in U.S. Pat. No. 4,034,421 to Pihl et al. and includes a tank provided for the collection of liquid-mixed wastes and a circulating pump having an inlet and outlet connected to the tank. The circulating pump is adapted to circulate the tank contents in a closed path for agitation and aeration. A liquid jet pump is inserted in the closed path to establish the necessary vacuum for the sewer system.

One problem that arises in typical vacuum sewer systems, however, is the case where there is a malfunction in the valve connecting the suction pipe to the vacuum pit, i.e., the vacuum sewer valve. A vacuum sewer valve that is stuck in an opened position, for example, may cause a decrease in efficiency of the vacuum sewer system. More particularly, the vacuum sewer system relies on the ability to apply a predetermined amount of vacuum pressure to each of the vacuum pits. A vacuum sewer valve that is stuck open on one vacuum pit, or even partially opened, may cause performance degradation of the suction able to be applied to the remaining pits, thereby decreasing the efficiency of the vacuum sewer system as a whole. Decreased efficiency of such a system may lead to increased energy consumption.

As described above, a typical vacuum sewer system may service a wide area. In that wide area, a single vacuum sewer system may have a plurality of spaced apart vacuum pits connected to a vacuum station, and each vacuum pit may be adapted to receive soiled water from a plurality of residential structures. Accordingly, if one vacuum sewer valve on one vacuum pit malfunctions, there currently exists no efficient manner to pinpoint the location of the vacuum pit where the valve may be malfunctioning. One manual method that is known for locating a malfunctioning vacuum sewer valve in a vacuum sewer system is for maintenance crews to drive to each vacuum pit and listen to hear if suction that is continuously running, which may be an indication that the vacuum sewer valve is stuck in the open position. This manual method, however, requires the use of many man hours, as well as the consumption of fuel to power the vehicle that is to transport the maintenance crew.

There exists a need for a system that provides an indication that a valve in a vacuum suction system is malfunctioning, as well as providing an indication of the location of the malfunctioning valve.

SUMMARY OF THE INVENTION

With the foregoing in mind, the present invention advantageously provides a system that readily detects a malfunction in a vacuum sewer system. The present invention also advantageously enhances efficiency of a vacuum sewer system by readily identifying a vacuum sewer valve that is malfunctioning. The present invention further advantageously decreases maintenance costs associated with a vacuum sewer system by decreasing costs associated with locating a vacuum sewer valve that is malfunctioning. The present invention still further advantageously provides various types of sensors adapted to identify a vacuum sewer valve that is malfunctioning.

These and other objects, features and advantages according to the present invention are provided by a valve malfunctioning detection system for use in a vacuum sewer system that includes a vacuum pit in fluid communication with a vacuum station. The vacuum pit may include a vacuum sewer valve that is moveable between an opened position and a closed position. The valve malfunctioning detection system may include a radio unit adapted to be carried by the vacuum pit, a gateway radio in communication with the radio unit, a hub radio in communication with the one gateway radio to receive a signal transmitted by the gateway radio, and a server in communication with the hub radio. The signal transmitted by the radio unit may include an indication of a status of the vacuum sewer valve.

The radio unit may include a housing, a controller carried by the housing, a power source carried by the housing and a threaded attachment connected to an end of the housing. A sensor may be carried by the threaded attachment and in communication with the controller.

The sensor may be an acoustic sensor adapted to sense a sound level within the vacuum pit, and the radio unit may transmit a signal including an indication of the status of the vacuum sewer valve responsive to the acoustic sensor. The sensor may also be a pressure sensor adapted to sense a pressure level within the vacuum pit, and the radio unit may transmit a signal including an indication of the status of the vacuum sewer valve responsive to the pressure sensor. The sensor may further be provided by an airflow sensor adapted to sense air flow within the vacuum pit, and the radio unit may transmit a signal including an indication of the status of the vacuum sewer valve responsive to the airflow sensor. The sensor may still further be a valve position sensor adapted to sense a position of the vacuum sewer valve, and the radio unit may transmit a signal including an indication of the status of the vacuum sewer valve responsive to the valve position sensor.

The controller may be provided by a printed circuit board with an etched antenna and in communication with power source. The radio unit may be carried by an upper portion of the vacuum pit. Further, the radio unit may include a mounting plate adapted to engage the upper portion of the vacuum pit so that the housing and the threaded connection are positioned to point towards an inner portion of the vacuum pit. The indication included in the signal transmitted by the radio unit may be an indication that the vacuum sewer valve is in the opened position for longer than a predetermined amount of time. The indication may also include location information of the vacuum sewer valve.

A method aspect of the present invention is for detecting a valve malfunction in a vacuum sewer system. The method may include transmitting a signal from the radio unit to the gateway radio. The signal transmitted by the radio unit may include an indication of a status of the vacuum sewer valve.

BRIEF DESCRIPTION OF THE DRAWINGS

FIG. 5 is a chart illustrating battery life of an aspect of the valve malfunctioning detection system according to an embodiment of the present invention.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations refer to similar elements in alternate embodiments.

Figure 1:
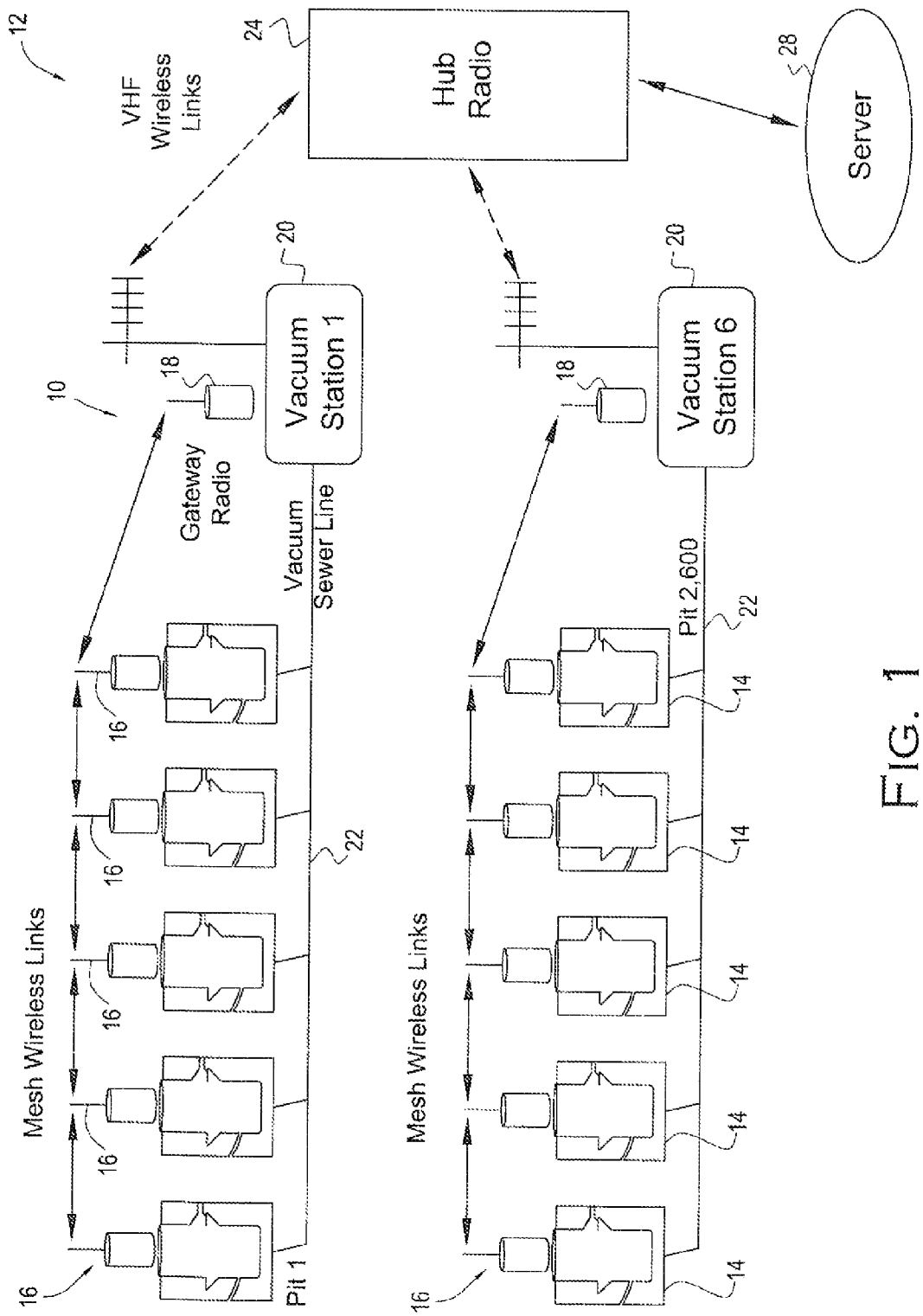
FIG. 1 is a schematic diagram of a valve malfunctioning detection system according to an embodiment of the present invention.
Figure 1A:
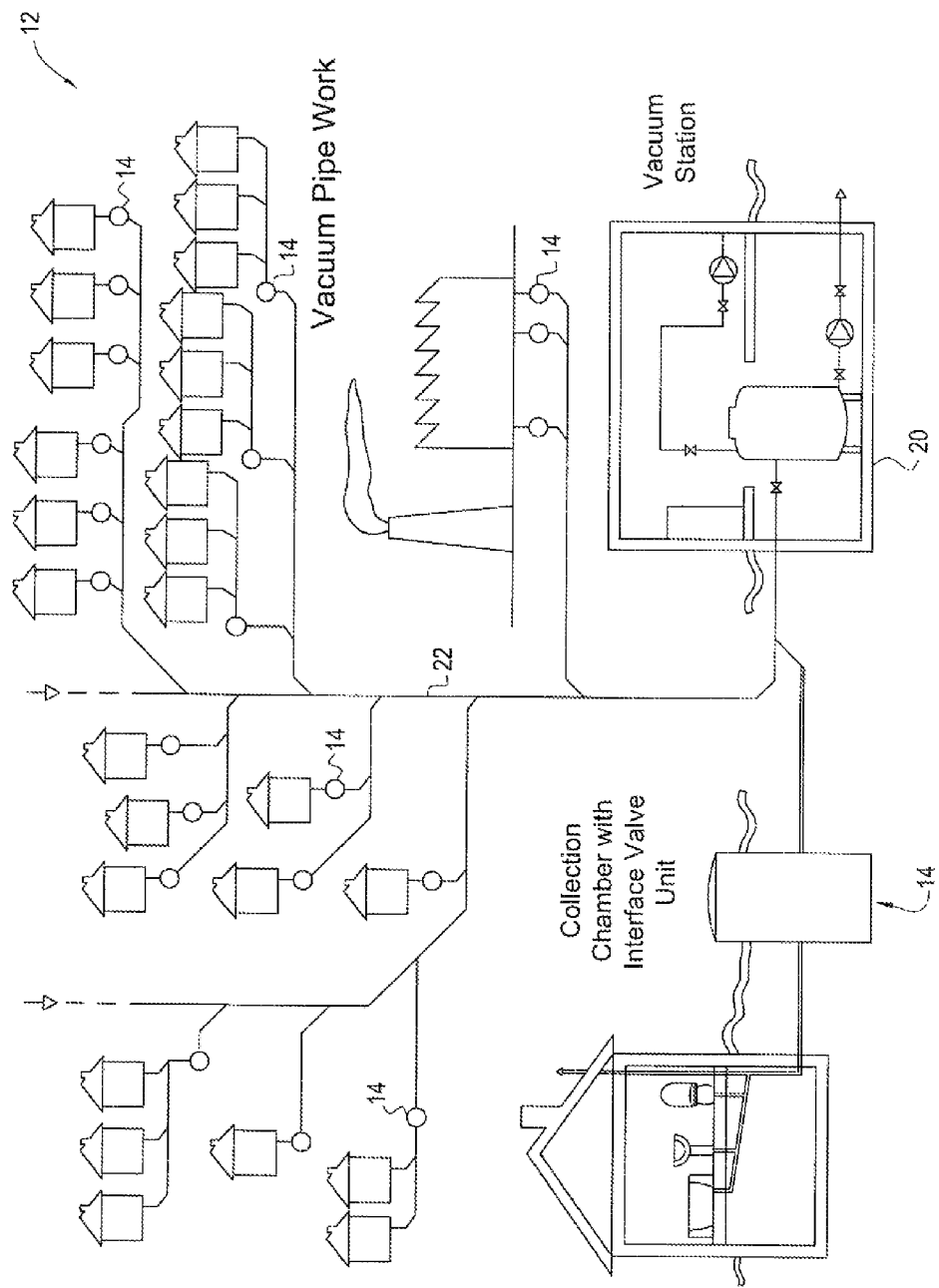
FIG. 1A is a schematic diagram of a vacuum sewer system including a plurality of vacuum pits, a vacuum sewer line and a vacuum station.

Referring initially to FIG. 1, a valve malfunctioning detection system 10 according to an embodiment of the present invention is now described in greater detail. As illustrated in FIG. 1, the valve malfunctioning detection system is adapted to be used in connection with a vacuum sewer system 12. A typical vacuum sewer system is illustrated in FIG. 1A. The vacuum sewer system 12 may illustratively include a plurality of vacuum pits 14. Each vacuum pit 14 is preferably adapted to accept soiled water from a plurality of structures. These structures may, for example, be residential structures, but it is conceivable for a vacuum sewer system 12 to be used in connection with commercial or industrial applications as well, as also illustrated in FIG. 1A. Each vacuum pit 14 includes a vacuum sewer valve that is moveable between an opened position and a closed position.

A radio unit 16 is adapted to be carried by a portion of each of the vacuum pits 14. More specifically, and as will be described in greater detail below, the radio unit 16 is preferably carried by an upper portion of each of the vacuum pits 14. The upper portion of each vacuum pit 14 preferably includes a tombstone or monument, i.e., a structural unit connected to the top of each vacuum pit to mark the location thereof. Each radio unit 16 may be positioned in communication with a gateway radio 18 that may be positioned at a vacuum station 20. As will also be discussed in greater detail below, the gateway radio 18 is adapted to receive a signal transmitted by each radio unit 16. Each vacuum pit 14 is positioned in fluid communication with a vacuum station 20 via a vacuum sewer line 22. The vacuum station 20 is adapted to apply a predetermined amount of suction pressure through the vacuum sewer line 22 which, in turn, applies vacuum pressure to each of the vacuum pits 14 to suck soiled water stored in the vacuum pits out to the vacuum station.

The vacuum sewer line 22 illustratively connects to each of the vacuum pits 14. More specifically, the vacuum sewer line 22 terminates within each of the vacuum pits 14 with a vacuum sewer valve. As indicated above, the vacuum sewer valve is moveable between an opened position and a closed position. When in the opened position, suction from the vacuum sewer line 22 is applied to the vacuum pit 14 to remove soiled water from therein. The vacuum sewer valve may be moved from the closed position to the open position responsive to a controller in communication with a sensor that senses a predetermined level of soiled water within the vacuum pit 14. More specifically, the sensor may be adapted to sense a predetermined elevation of soiled water within the vacuum pit 14. Upon sensing that the soiled water level within each vacuum pit 14 has reached a predetermined level, a signal is sent to the controller to move the vacuum sewer valve to the opened position. Once it is determine that the soiled water level has reached a second predetermined level, i.e., that a certain amount of soiled water has been removed from the vacuum pit 14, the vacuum sewer valve is moved to the closed position.

Vacuum pressure may be constantly applied from the vacuum stations 20 through the vacuum sewer line 22. When the vacuum sewer valve is closed, however, vacuum pressure is not being applied to each of the vacuum pits 14. The typical amount of time that the vacuum sewer valve remains open is relatively short due to the fact that the time needed to drain the vacuum pit 14 of the soiled water to a desired level is relatively short. This advantageously enhances system performance. More specifically, when the vacuum sewer valve is open, less suction can be applied to other vacuum pits 14. Accordingly, in the case where a vacuum sewer valve malfunctions and is stuck in the opened position, system performance is decreased. This causes a downstream effect to other vacuum pits 14 on the same vacuum sewer line 22 because it will take additional time to drain the vacuum pits to the desired level as the system performance has been degraded.

Each of the gateway radios 18 at each of the vacuum stations 20 are illustratively positioned in communication with a hub radio 24. The hub radio 24 is illustratively adapted to be in communication with multiple vacuum stations 20. Further, the hub radio receives signals from the gateway radio 18. Those skilled in the art, after having had the benefit of reading this disclosure, will appreciate that a hub radio 24 may be adapted to receive signals from any number of gateway radios 18 and may be adapted to cover a predetermined geographical location. In some cases, it may be possible to use one hub radio 24 to receive communications from all gateway radios 18 at all vacuum stations 20. In other cases, depending on the geographical positioning of the vacuum stations 20, it may be necessary for multiple hub radios 24 to be used to receive all signals from all gateway radios 18 associated with the vacuum sewer system 12. The valve malfunctioning detection system 10 according to the present invention, however, contemplates that the hub radio 24 may be configured in any number of different ways while still accomplishing the goals, features and objectives according to the present invention.

The hub radio 24 may be positioned in communication with a server 26 so that the status of each vacuum pit 14 and, more particularly, the status of each vacuum sewer valve may be remotely monitored. Those having skill in the art will appreciate, after having had the benefit of reading this disclosure, that the server 26 may be adapted to monitor multiple hub radios 24 in a single vacuum sewer system 12, thereby allowing for the monitoring of every vacuum pit 14 and every vacuum sewer valve in a vacuum sewer system, and may also be adapted to monitor hub radios associated with a plurality of vacuum sewer systems, regardless of the geographical locations. More specifically, the server 26 may be used to monitor signals transmitted by the radio unit 16. The signals transmitted by each of the radio units 16 may include an indication of the status of each vacuum sewer valve. For example, a signal transmitted by a radio unit 16 of the vacuum sewer system may be an indication that one of the vacuum sewer valves is in the opened position for longer than a predetermined amount of time. This could indicate that the vacuum sewer valve is malfunctioning, and in need of maintenance.

Figure 2:
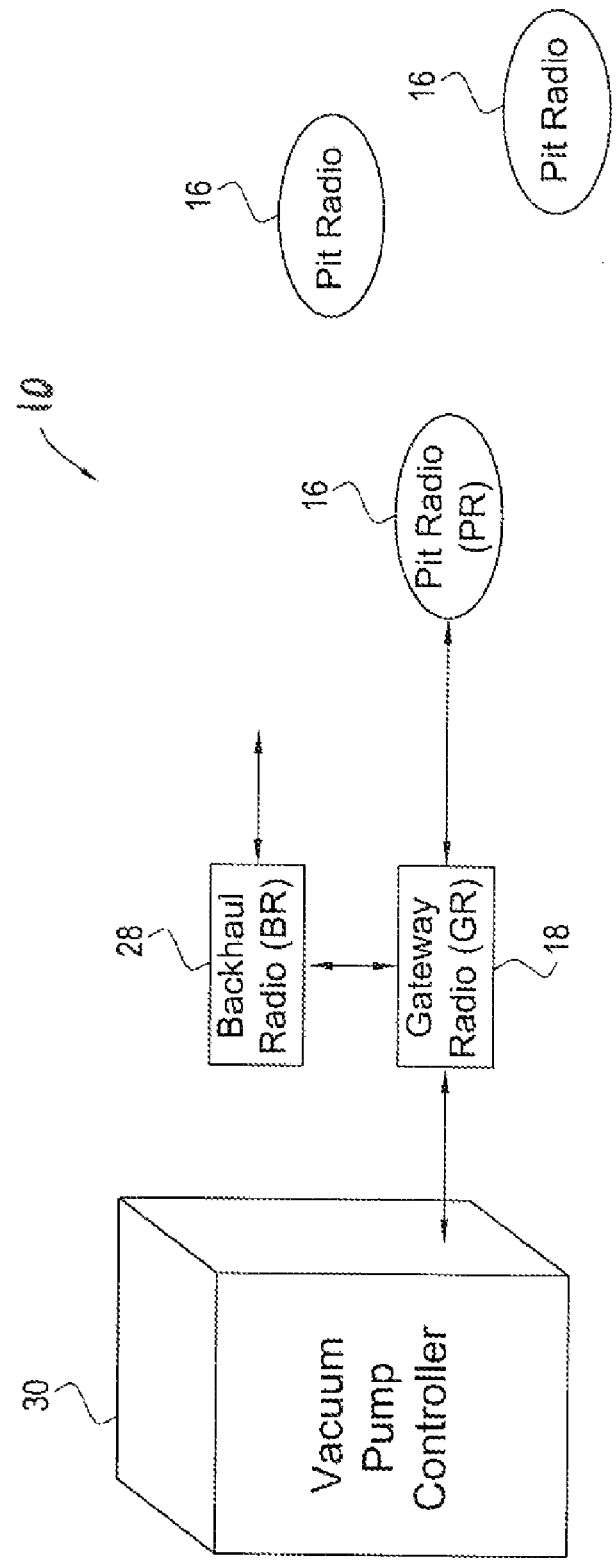
FIG. 2 is a schematic diagram of an aspect of the valve malfunctioning detection system according to an embodiment of the present invention.

Referring now additionally to FIG. 2, additional features of the valve malfunctioning detection system 10 according to an embodiment of the present invention is now described in greater detail. A vacuum pump controller 30 may be positioned in communication with a vacuum pump at the vacuum station 20. The vacuum pump controller 30 may detect the presence of a failure or a malfunction. This can be determined by monitoring the amount of suction through the vacuum sewer line 22. If it is determined that there is a decreased amount of suction in the vacuum sewer line 22, then a failure of one of the vacuum sewer valves in the vacuum sewer system may be assumed. A vacuum sewer valve that has failed or is malfunctioning is stuck in an opened (or partially opened) position, thereby decreasing the efficiency of the vacuum sewer system. In other words, suction pressure throughout the vacuum sewer system may be decreased due to suction pressure being used in a place where there is no need for it to be used. The gateway radio 18 may be positioned in communication with the vacuum pump controller 30 and is adapted to be in a hibernate mode or sleep mode. The gateway radio 18 waits for a predetermined amount of time for a wake-up timer to expire and sends a failure notice to each of radio units 16 positioned at each of the vacuum pits 14. As illustrated, each of the vacuum pits 14 may include a radio unit 16 (defined in FIG. 2 as a pit radio (PR)).

Each pit radio 16 may include a processor that is adapted to be in a hibernate mode (or sleep mode) for a predetermined amount of time. The processor preferably wakes up each time the vacuum sewer valve opens. The time on and time off of the vacuum sewer valve may be recorded. This data can be recorded in any number of ways. For example, the time that the vacuum sewer valve opens may be recorded and the time that the vacuum sewer valve closes may be recorded. Alternately, a timer maybe used to measure how long the vacuum sewer valve was in the opened position. Further, it is to be understood by those skilled in the art, after having had the benefit of reading this disclosure, that it is contemplated that the data can include the amount of time that the vacuum sewer valve remains partially opened. The present invention contemplates that the time may be measured from the instant that the vacuum sewer valve is moved from the closed position to the time that the vacuum sewer valve is moved completely to the closed position. Alternately, the time may be measured as the time that the vacuum sewer valve is in a fully opened position. After having had the benefit of reading this disclosure, those skilled in the art will appreciate that any combination of times may be recorded while still accomplishing the goals, features and advantages according to the present invention.

The processor may be adapted to wake up periodically, as over a predetermined time range, e.g., the processor may be adapted to wake up every 4 minutes. If a failure notice is received, the pit radio 16 having the failure transmits a signal including reporting the failure immediately. This failure signal is preferably transmitted to the gateway radio 18 which, in turn, transmits the failure signal to the hub radio 24 which, in turn, transmits the signal to the server 28. As will be discussed in greater detail below, a failure may be detected in any number of ways. Sensors are used to determine if a vacuum sewer valve is malfunctioning and stuck in an opened or partially opened position. A report is transmitted to the gateway radio 18 indicating which vacuum pit(s) 14 have a vacuum sewer valve that has malfunctioned. Alternately, records of the failures may be stored by the processor. In that case, the stored records may be received and forwarded to a backhaul radio (server) 28 which may be positioned in communication with the gateway radio 18.

Figure 3:
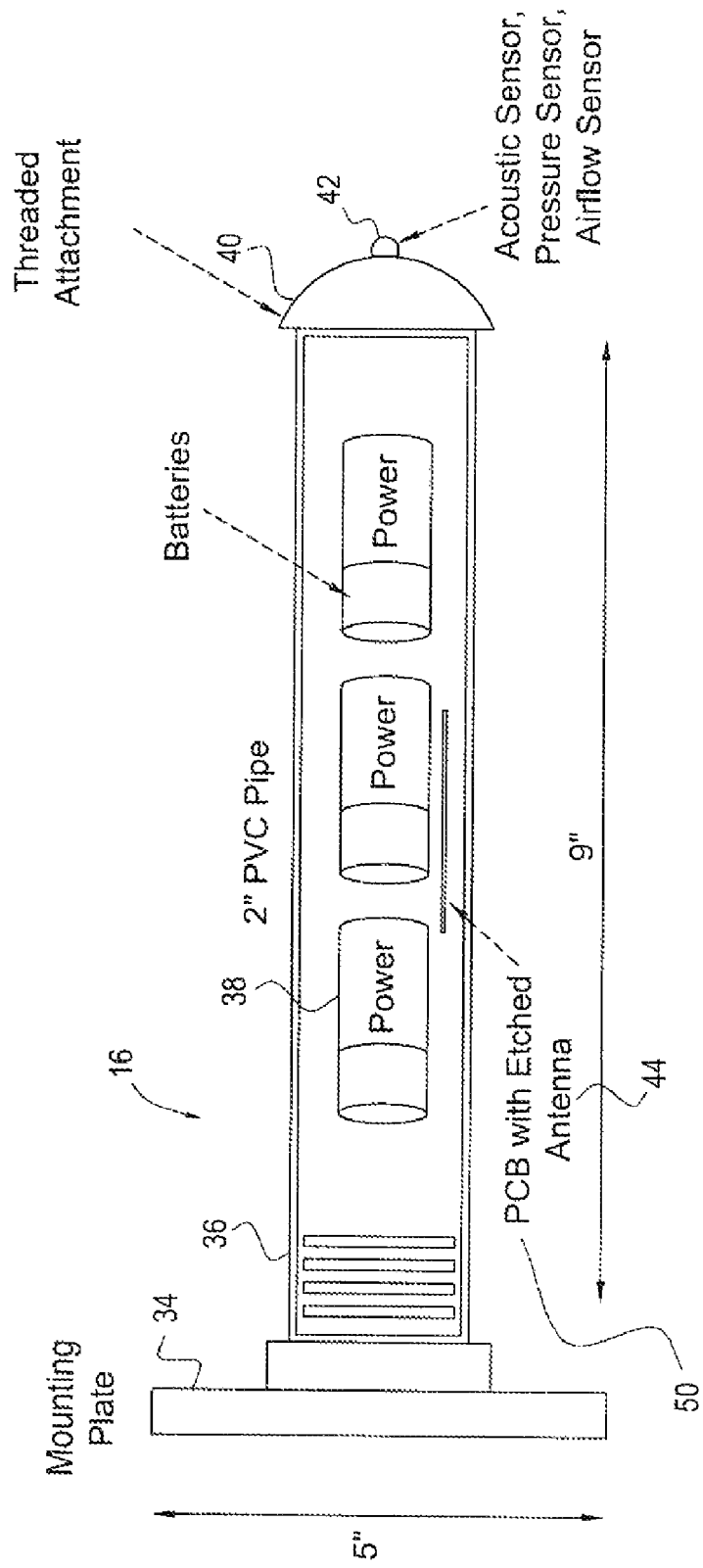
FIG. 3 is a schematic diagram of a radio unit for use with a valve malfunctioning detection system according to an, embodiment of the present invention.

Referring now additionally to FIG. 3, additional features of each radio unit 16 of the valve malfunctioning detection system 10 according to an embodiment of the present invention is now described in greater detail. Each radio unit 16 is adapted to be carried by the tombstone 32 that is carried by an upper portion of each vacuum pit 14 (illustrated in FIG. 4 and to be discussed in greater detail below). The radio unit 16 includes a mounting plate 34, a housing 36 connected to and extending downwardly from the mounting plate, and a power source 38 carried by the housing. The power source 38 is preferably provided by at least one battery, but those having skill in the art will appreciate, after having had the benefit of reading this disclosure, that the power source may be provided by any number of power sources, and may be either an alternating current power source or a direct current power source. As will be discussed in greater detail below, however, the use of simple batteries for the power source 38 is preferable for ease of use, as well as longevity. The use of batteries as the power source 38 is also advantageous in that the cost of batteries can be relatively low. The present invention also advantageously contemplates the use of rechargeable batteries as the power source 38 to minimize waste.

The radio unit 16 also illustratively includes a threaded attachment 40 connected to an end of the housing 36 to enclose the power source within the housing. The threaded attachment 40 may be connected to the housing 36 using a connection that is preferably watertight or water resistant, as understood by those skilled in the art. The threaded attachment 40 illustratively carries a sensor 42 for sensing whether or not a vacuum sewer valve is stuck in an opened or partially opened position.

As illustrated in FIG. 3, the valve malfunctioning detection system 10 also includes a controller provided by a printed circuit board (PCB) 50. The PCB 50 is adapted to be in communication with the power source 38 and the sensor 42. Further, an antenna 44 may be carried by the PCB 50 to receive and transmit signals associated with the sensor 42. Those skilled in the art, after having had the benefit of this disclosure, will appreciate that the antenna 44 may, for example, be provided by a patch antenna, but that any other type of antenna may also be suitable to carry out the goals, features and advantages according to the present invention.

The sensor 42 may, for example, be an acoustic sensor, a pressure sensor, an airflow sensor or a mechanical sensor. Any one of these types of sensors 42 may be used individually or in combination to carry out the features, benefits and advantages according to an embodiment of the present invention. More specifically, any one of the these sensors 42 may be used to determine whether or not the vacuum sewer valve is stuck in an opened or partially opened position and, in communication with the radio unit 16, transmit a failure indication back to the server 28 to identify the location of a vacuum sewer valve that is malfunctioning. It is preferably that the sensor 42 be used to determine whether or not the vacuum sewer valve is stuck in an opened or partially opened position for longer than a predetermined amount of time before the failure indication is transmitted.

It is preferably that the failure indication includes location information so that the location of the vacuum sewer valve that is malfunctioning can be readily determined. This advantageously reduces the amount of time and labor that may be necessary to determine the location of the malfunctioning vacuum sewer valve and in repairing or replacing the malfunctioning vacuum sewer valve. Location information can be provided or determined in several different ways. For example, each radio unit 16 may include a global positioning sensor in communication therewith to provide location information. Further, each radio unit 16 preferably includes a unique identifier associated therewith. The unique identifier may be associated with a unique location that may be stored in a database. Accordingly, the location of the radio unit 16 may be readily assessed by accessing the database containing the location information. Alternately, each radio unit 16 may simply include data stored thereon relating to its location, and that location data may be transmitted along with any failure signal. Therefore, each radio unit 16 is preferably programmable with location information so that the radio units may be moved from location to location.

The sensor 42 may, for example, be an acoustic sensor. The acoustic sensor may be adapted to detect a certain level of sound (likely measured in decibels) for a predetermined amount of time. More specifically, the acoustic sensor may be adapted to report a failure when a sound having a minimum predetermined decibel level is detected for a predetermined amount of continuous time. This can be correlated to a vacuum sewer valve being stuck in an opened or partially opened position and the sound that is generated by the continuous suction within the vacuum pit 14. Accordingly, the radio unit 16 may transmit a signal including an indication of the status of the vacuum sewer valve responsive to the acoustic sensor.

The sensor 42 may, for example, also be pressure sensor. The pressure sensor may be adapted to detect a certain pressure level or differential within the vacuum pit 14. More specifically, the pressure sensor may be adapted to report a failure when the pressure differential within the vacuum pit 14 reaches a predetermined level for a predetermined amount of continuous time. This indication, as well, may be attributed to a vacuum sewer valve being stuck in an opened or partially opened position and the pressure differential that may be generated by the continuous suction within the vacuum pit 14. Accordingly, the radio unit 16 may transmit a signal including an indication of the status of the vacuum sewer valve responsive to the pressure sensor.

The sensor may also, for example, be an air flow sensor. The air flow sensor may be adapted to detect a certain air flow, e.g., air velocity, within the vacuum pit 14. More specifically, the air flow sensor may be adapted to report a failure when the air flow within the vacuum pit 14 reaches a predetermined level for a predetermined amount of continuous time. This indication may be attributed to a vacuum sewer valve being stuck in an opened or partially opened position and the air flow within the vacuum pit that may be generated by the continuous suction caused by the vacuum sewer valve being stuck in the opened or partially opened position. Accordingly, the radio unit 16 may transmit a signal including an indication of the status of the vacuum sewer valve responsive to the air flow sensor.

The valve malfunctioning detection system according to the present invention also contemplates the use of a mechanical sensor, e.g., a valve position sensor that senses the status of the vacuum sewer valve. More specifically, a mechanical sensor may be installed that senses whether the vacuum sewer valve is in the opened or closed position (or partially opened position) and the amount of time that the vacuum sewer valve remains in either the opened or closed position (or partially opened). The valve position sensor may, for example, be adapted to detect contact that would normally made between portions of the vacuum sewer valve and the surrounding pipe that carries the valve, i.e., a contact closure sensor. Accordingly, the radio unit 16 may transmit a signal including an indication of the status of the vacuum sewer valve responsive to the valve position sensor.

Figure 4:
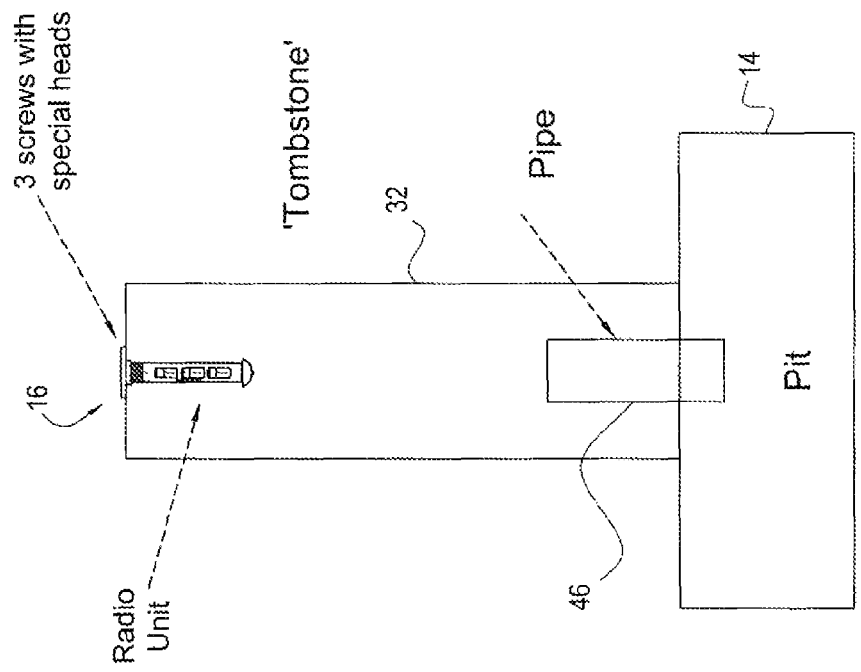
FIG. 4 is a schematic diagram of a radio unit of a valve malfunctioning detection system according to an embodiment of the present invention installed on a tombstone of a vacuum pit of a vacuum sewer system.

Referring now additionally to FIG. 4, additional features of the valve malfunctioning detection system 10 according to an embodiment of the present invention are now described in greater detail. As illustrated, the radio unit 16 is preferably carried by an upper portion of the vacuum pit 14. More specifically, the radio unit 16 is illustratively adapted to engage a tombstone 32 (or monument) associated with each of the vacuum pits 14 in a vacuum sewer system 12. The tombstone 32 illustratively overlies an upper portion of each vacuum pit 14 so that the vacuum pit may be readily located by, for example, maintenance personnel and others. The tombstone 32 may be provided by a tubular member having a base, sidewalls extending upwardly from the base, and a top. A passageway may be formed in the top of the tombstone 32 to carry the radio unit 16. More specifically, it is preferable that the radio unit 16 be carried by the top of the tombstone 32 so that the mounting plate 34 engages the top of the tombstone and the housing 36 of the radio unit extends downwardly therefrom within the tubular structural portion of the tombstone towards an inner portion of the vacuum pit 14. Accordingly, the sensor 42 carried by the threaded attachment 40 of the radio unit 16 is positioned within the tombstone adjacent the lowermost portion of the radio unit.

A passageway may be formed between the vacuum pit 14 and the tombstone 32 to provide access to an interior portion of the vacuum pit for monitoring purposes. In the embodiment of the invention illustrated in FIG. 4, the passageway is formed using a pipe 46 that extends through a top portion of the vacuum pit 14 and into a portion of the tombstone 32. As illustrated, the passageway may be formed using a polyvinyl chloride (PVC) pipe to advantageously minimize corrosion, but those skilled in the art, after having had the benefit of reading this disclosure, will appreciate that any other type of tubular material may be used to form the passageway. This advantageously allows for conditions within the vacuum pit to be monitored by the sensor to determine if any predetermined condition is an indication that the vacuum sewer valve is stuck in an opened position.

The configuration of the valve malfunctioning detection system 10 according to the present invention advantageously requires minimal time and effort for installation. More particularly, each radio unit 16 is provided by a self contained unit. The installation process is simplistic in nature, and includes forming a passageway between the vacuum pit 14 and the tombstone 32, if one is not already formed therein, forming a passageway in a top portion of the tombstone, inserting the radio unit 16 within the tombstone and securing the radio unit to the top portion of the tombstone. As illustrated, it is contemplated that a plurality of screws be used to secure the radio unit 16 to the tombstone 32, but those skilled in the art, after having had the benefit of reading this disclosure, will appreciate that any type of fastener may be used to secure the radio unit to the tombstone.

The valve malfunctioning detection system 10 according to an embodiment of the present invention advantageously enhances performance of vacuum sewer systems 12 in that there is a more immediate identification and repair of a vacuum sewer valve that is malfunctioning, i.e., stuck in an opened or partially opened position, thereby causing decreased performance of the vacuum sewer system which may, in turn, lead to excess energy used to account for the decreased performance. In many ways, the valve malfunctioning detection system 10 according to the present invention acts as an energy conservation system. Not only does the valve malfunctioning detection system 10 readily allow for identification of a malfunctioning vacuum sewer valve that causes excess energy use, but it also eliminates the need for a maintenance worker to drive throughout the geographical extent of the vacuum sewer system to attempt to locate the malfunctioning vacuum sewer valve.

It is common for a municipality, for example, to be able to identify that a vacuum sewer valve is malfunctioning by noticing decreases in efficiency of the vacuum sewer system. When such a determination is made, the only way to identify which, of the potentially hundreds, of vacuum sewer valves is malfunctioning, is to manually inspect all of them. This is not to say that each vacuum sewer valve has to be visually inspected. These can be identified from a short distance away by a maintenance worker, for example. More particularly, it is common place for a maintenance worker to drive through the area where the vacuum pits 14 are located with the windows of the vehicle down and listen for a constant noise caused by the suction being continuously applied to the vacuum pit because of a vacuum sewer valve that is stuck in an opened, or partially opened, position. Accordingly, the valve malfunctioning detection system 10 according to an embodiment of the present invention conserves the fuel that would otherwise be consumed by the vehicle in driving throughout an area searching for the vacuum sewer valve that is malfunctioning.

The valve malfunctioning detection system 10 according to an embodiment of the present invention may advantageously be used without gateway radios 18 and hub radios 28. More particularly, it is anticipated that some areas that use vacuum sewer systems 12 may not be in a position to install such devices or may be too small to justify the cost more sophisticated equipment. As such, the radio units 16 of the present invention may be adapted to transmit a signal that may be detected using a simple handheld receiver. Such a signal can be transmitted to a predetermined range. Accordingly, a receiver may be used to readily ascertain the position. More particularly, and in the case of a municipality that utilizes the current system of driving throughout a geographical area of a vacuum sewer system 12 to locate a malfunctioning vacuum sewer valve, the maintenance worker may, for example, simply use the receiver to ascertain the location of the malfunctioning vacuum sewer valve. This can be done in a much more rapid fashion than the traditional method of locating a malfunctioning vacuum sewer valve and can also be done with much less driving.

Referring now additionally to FIG. 5, a power source 38 for each of the radio units 16 is now described in greater detail. The graphical illustration 48 presented in FIG. 5 depicts energy consumption in amp-hours/month based on the number of openings of the vacuum sewer valve. The graphical illustration 48 shows the different types of power sources 38 that may be used to provide power to the radio unit 16. More specifically, the radio unit 16 may be readily powered with common batters, e.g., C or D size batteries. The batteries should provide suitable power for at least one year. As a precaution, it is recommended that the batteries on the radio units be changed yearly. The power source may also be provided by utilizing solar energy. More specifically, a solar collector may be carried by the housing 36 so that solar energy may be harnessed to power the valve malfunctioning detection system 10.

A method aspect of the present invention may include installing a valve malfunctioning detection system 10. The method may include forming a passageway between the vacuum pit 14 and the tombstone 32. The method may also include forming a passageway in a top portion of the tombstone, inserting the radio unit 16 within the tombstone and securing the radio unit to the top of the tombstone. The method further includes securing the radio unit to the top portion of the tombstone using a plurality of fasteners.

Another method aspect of the present invention is for detecting a vacuum sewer valve in a vacuum sewer system 12 that is stuck in an opened or partially opened position. The method may include transmitting a signal from a radio unit 16 adapted to be carried by the vacuum pit 14 to a gateway radio 18 in communication with the radio unit. The method may also include transmitting the signal received from the radio unit 16 to a hub radio 24, and thereafter transmitting the signal received by the hub radio to the server 28. Alternately, and depending on the size of the vacuum sewer system 12, the signal may be transmitted from the radio unit 16 directly to the server 28.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A valve malfunctioning detection system for use in a vacuum sewer system including at least one vacuum pit in fluid communication with at least one vacuum station, the at least one vacuum pit including at least one vacuum sewer valve that is moveable between an opened position and a closed position, the valve malfunctioning detection system comprising:

at least one radio unit adapted to be carried by the at least one vacuum pit of the vacuum sewer system, the at least one radio unit comprising
a housing,
a controller carried by the housing,
a power source carried by the housing, a threaded attachment connected to an end of the housing, and
at least one sensor carried by the threaded attachment and in communication with the controller;
at least one gateway radio in communication with the at least one radio unit, the at least one gateway radio being positioned adjacent a respective at least one vacuum station of the vacuum sewer system to receive at least one signal transmitted by the at least one radio unit;
a hub radio in communication with the at least one gateway radio to receive at least one signal transmitted by the at least one gateway radio; and
at least one server in communication with the hub radio;
wherein the signal transmitted by the at least one radio unit includes an indication of a status of the vacuum sewer valve.

2. A valve malfunctioning detection system according to claim 1 wherein the at least one sensor is an acoustic sensor adapted to sense a sound level within the at least one vacuum pit.

3. A valve malfunctioning detection system according claim 2 wherein the at least one radio unit transmits a signal including an indication of the status of the vacuum sewer valve responsive to the acoustic sensor.

4. A valve malfunctioning detection system according to claim 1 wherein the at least one sensor is a pressure sensor adapted to sense a pressure level within the at least one vacuum pit.

5. A valve malfunctioning detection system according to claim 4 wherein the at least one radio unit transmits a signal including an indication of the status of the vacuum sewer valve responsive to the pressure sensor.

6. A valve malfunctioning detection system according to claim 1 wherein the at least one sensor is an airflow sensor adapted to sense air flow within the at least one vacuum pit.

7. A valve malfunctioning detection system, according to claim 6 wherein the at least one radio unit transmits a signal including an indication of the status of the vacuum sewer valve responsive to the airflow sensor.

8. A valve malfunctioning detection system according to claim 1 wherein the at least one sensor is a valve position sensor adapted to sense a position of the vacuum sewer valve.

9. A valve malfunctioning detection system according to claim 8 wherein the at least one radio unit transmits a signal including an indication of the status of the vacuum sewer valve responsive to the valve position sensor.

10. A valve malfunctioning detection system according to claim 1 wherein the controller is provided by a printed circuit board with an etched antenna and in communication with the power source.

11. A valve malfunctioning detection system according to claim 1 wherein the at least one radio unit is carried by an upper portion of the vacuum pit.

12. A valve malfunctioning detection system according to claim 1 wherein the at least one radio unit further comprises a mounting plate adapted to engage an upper portion of the at least one vacuum pit so that the housing and the threaded connection are positioned to point towards an inner portion of the at least one vacuum pit.

13. A valve malfunctioning detection system according to claim 1 wherein the indication is an indication that the vacuum sewer valve is in the opened position for longer than a predetermined amount of time, and wherein the indication includes location information of the vacuum sewer valve.

14. A valve malfunctioning detection system for use in a vacuum sewer system including a plurality of vacuum pits in fluid communication with at least one vacuum station, each of the plurality of vacuum Pits including at least one vacuum sewer valve that is moveable between an opened position and a closed position, the valve malfunctioning detection system comprising:
at least one radio unit adapted to be carried by each of the plurality of vacuum pits, the at least one radio unit comprising
a housing,
a controller carried by the housing,
a power source carried by the housing,
a threaded attachment connected to an end of the housing, and
at least one sensor carried by the threaded attachment and in communication with the controller,
wherein the controller is provided by a printed circuit board with an etched antenna and is positioned in communication with the power source;
wherein the signal transmitted by the at least one radio unit includes an indication that the vacuum sewer valve is opened for a length of time responsive to the at least one sensor; and
wherein the at least one radio unit is carried by an upper portion of each of the plurality of vacuum sewer pits.

15. A valve malfunctioning detection system according to claim 14 further comprising:
at least one gateway radio in communication with the at least one radio unit, the at least one gateway radio being positioned adjacent a respective at least, one vacuum station of the vacuum sewer system to receive at least one signal transmitted by the at least one radio unit;
a hub radio in communication with the at least one gateway radio to receive at least one signal transmitted by the at least one gateway radio; and
at least one server in communication with the hub radio.

16. A valve malfunctioning detection system according to claim 14 wherein the at least one sensor is at least one of an acoustic sensor adapted to sense a sound level within the vacuum pit, a pressure sensor adapted to sense a pressure level within the vacuum pit, an airflow sensor adapted to sense air flow within the vacuum pit, and a valve position sensor adapted to sense a position of the vacuum sewer valve.

17. A valve malfunctioning detection system according to claim 16 wherein the at least one radio unit transmits a signal including an indication of the status of the vacuum sewer valve responsive to at least one of the acoustic sensor, the pressure sensor, the airflow sensor and the valve position sensor.

18. A valve malfunctioning detection system according to claim 14 wherein the at least one radio unit further comprises a mounting plate adapted to engage the upper portion of the vacuum pit so that the housing and the threaded connection are positioned to point towards an inner portion of the vacuum pit.

19. A method of detecting a valve malfunction in a vacuum sewer system, the vacuum sewer system including at least one vacuum pit in fluid communication with at least one vacuum station, the at least one vacuum pit including at least one vacuum sewer valve that is moveable between an opened position and a closed position, the method comprising:
transmitting a signal from at least one radio unit adapted to be carried by the, at least one vacuum pit to at least one gateway radio in communication with the at least one radio unit, the at least one gateway radio being positioned adjacent a respective at least one vacuum station of the vacuum sewer system to receive the signal transmitted by the at least one radio unit, and wherein the at least one gateway radio is in communication with a hub radio that receives the signal from the at least one gateway, and wherein the at least one hub radio is in communication with at least one server;

wherein the at least one radio unit comprises a housing, a controller carried by the housing, a power source carried by the housing, a threaded attachment connected to an end of the housing, and at least one sensor carried by the threaded attachment and in communication with the controller; and wherein the signal transmitted by the at least one radio unit includes an indication of a status of the vacuum sewer valve.

20. A method according to claim 19 wherein the controller is provided by a printed circuit board with an etched antenna and is positioned in communication with the power source.

21. A method according to claim 20 wherein the at least one sensor is an acoustic sensor, and further comprising sensing a sound level within the at least one vacuum pit; and wherein the signal that is transmitted includes an indication of the status of the vacuum sewer valve responsive to the acoustic sensor.

22. A method according to claim 20 wherein the at least one sensor is a pressure sensor, and further comprising sensing a pressure level within the at least one vacuum pit: and wherein the signal that is transmitted includes an indication of the status of the vacuum sewer valve responsive to the pressure sensor.

23. A method according to claim 20 wherein the at least one sensor is an airflow sensor, and further comprising sensing air flow within the at least one vacuum pit; and wherein the signal that is transmitted includes an indication of the status of the vacuum sewer valve responsive to the airflow sensor.

24. A method according to claim 20 wherein the at least one sensor is a valve position sensor, and further comprising sensing a position of the vacuum sewer valve and wherein the signal that is transmitted includes an indication of the status of the vacuum sewer valve responsive to the valve position sensor.

25. A method according to claim 20 wherein the at least one radio unit is carried by an upper portion of the vacuum pit, and where the at least one radio unit further comprises a mounting plate adapted to engage the upper portion of the at least one vacuum pit so that the housing and the threaded connection are positioned to point towards an inner portion of the at least one vacuum pit.

26. A method according to claim 20 wherein the indication is an indication that the vacuum sewer valve is in the opened position for longer than a length of time, and wherein the indication includes location information of the vacuum sewer valve.

* * * * *